Oct. 27, 1964 J. J. MARTIN 3,154,319

EQUALIZING BOGIE STRUCTURE

Filed Jan. 17, 1962 6 Sheets-Sheet 1

INVENTOR.
J. J. MARTIN

BY Robb & Robb
attorneys

INVENTOR.
J. J. MARTIN
BY
Robb & Robb
attorneys

EQUALIZING BOGIE STRUCTURE
Filed Jan. 17, 1962 6 Sheets-Sheet 3
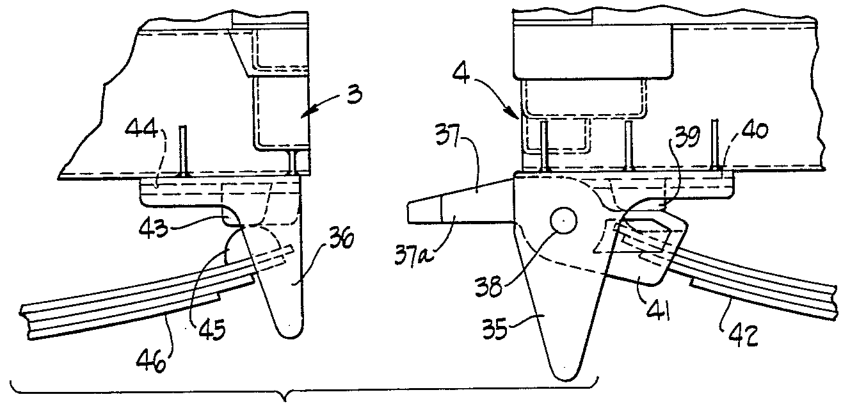
FIG_7
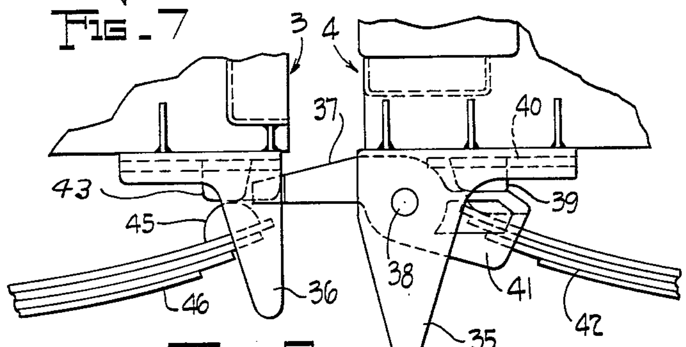
FIG_8
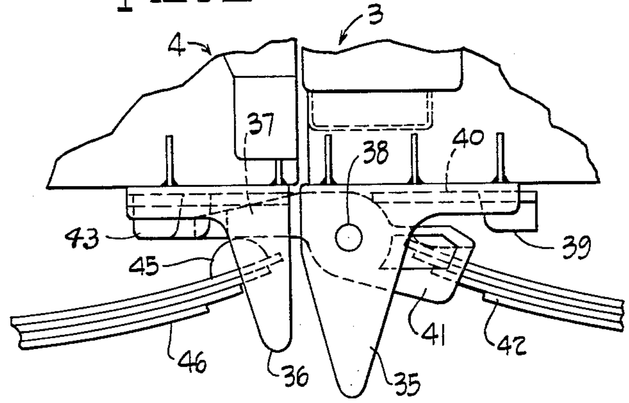
FIG_9
INVENTOR.
J. J. MARTIN
BY Robb & Robb
attorneys EQUALIZING BOGIE STRUCTURE
Filed Jan. 17, 1962 6 Sheets-Sheet 4
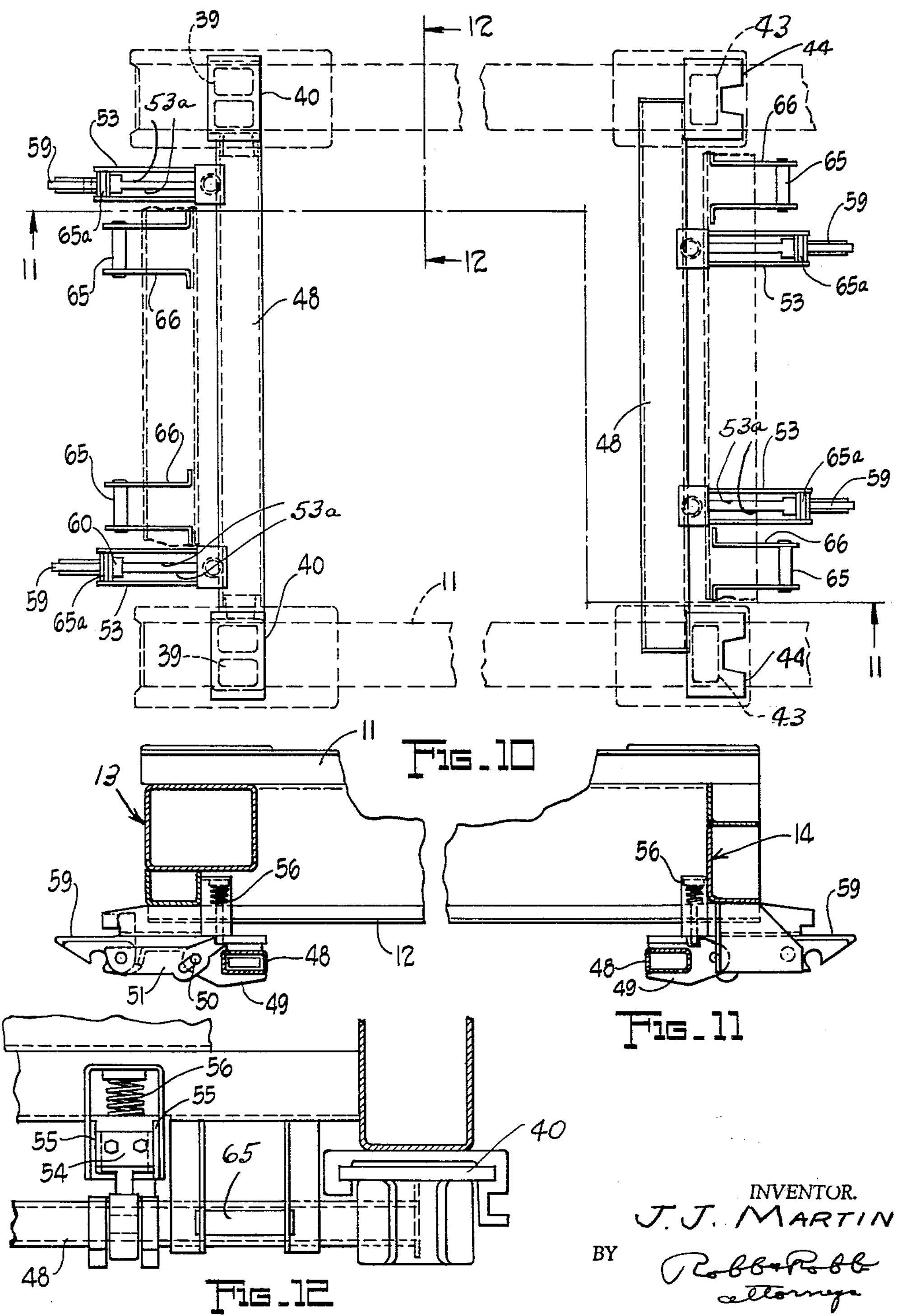
INVENTOR.
J. J. MARTIN
BY Robb & Robb
attorneys

EQUALIZING BOGIE STRUCTURE

INVENTOR.
J. J. MARTIN
BY Robb & Robb
attorneys

EQUALIZING BOGIE STRUCTURE

Filed Jan. 17, 1962 6 Sheets-Sheet 6

INVENTOR.
J. J. MARTIN
BY
Robb & Robb
attorneys

United States Patent Office 3,154,319 Patented Oct. 27, 1964

3,154,319
EQUALIZING BOGIE STRUCTURE

John J. Martin, Weatherly, Pa., assignor to Highway Trailer Industries, Inc., Edgerton, Wis., a corporation of Delaware Filed Jan. 17, 1962, Ser. No. 168,014
4 Claims. (Cl. 280—104.5)

This invention relates to trailer construction, and particularly to the bogie or bogies which comprise the running gear thereof.

In trailer body construction which involves the support of the same for suitable over-the-highway use, depending upon the sizes of the trailer and the amount of freight or weight which it is designed to carry, the same may generally be supported upon tandem axes, since the same provide a more flexible unit as to the type and amount of freight carried by the trailer, and with this in mind it is highly desirable that the relationship of the tandem axles be such that an equalizing action is possible to take place whereby the weight of the trailer is supported in a more nearly uniform manner even though the road over which the trailer is traveling is more or less rough in spots.

With the foregoing in mind, other aspects of the bogie construction are important, such as those wherein the trailer body is comprised of two or more sections which may be individually arranged for movement as individual trailers, wherein it is desirable to provide a single axle unit to support the same when the body is in its separated condition, and a tandem or other axle arrangement where two or more of the bodies are coupled together for over-the-road operation. Under the latter condition, it is highly desirable that the tandem axle relationship be established wherein an equalizing action exists and thereby the entire movement of the body as such is facilitated irrespective of the type of road over which the unit travels.

Where a body is divisible into two or more sections which in themselves may become trailer units, the running gear is preferably removable or at the very least movale along beneath the body so as to position one axle unit or bogie underneath one section of the body and the other axle or bogie unit under the other section of the body with corresponding fifth wheel connections being provided whereby smaller units are furnished for purposes which will be clear to those skilled in the art.

With the foregoing general understanding of the field in which the invention herein finds application, it is important to point out that means for effecting an equalizing interaction between two or more bogie units is essentialy the concept hereof and is carried out in a novel and unique manner, availing of simple instrumentalities which operate automatically during movement of the respective bogies to and fro beneath the body or body sections which they will support during movement as trailer units or as a single unit.

It is a principal object of this invention to provide bogie units in which are incorporated equalizing members, arranged to operate as such when the bogies with which they are associated are in juxtaposition and when the bogies are separated, the equalizing function necessarily is not desirable and therefore it is a purpose hereof to make possible the equalizing action to take place when desirable and to render it ineffective when it is no longer necessary or of any particular value.

Another object of this invention is to provide novel means involving movable elements which will render the equalizing member operative as a result of bringing the bogie units with which the same may be associated into juxtaposition, certain parts incorporated in the bogie units adjacent the spring ends which support the same and the bodies thereby, causing such means to operate to put the equalizing unit into operation, and likewise to render the equalizing unit inoperative when the bogie units are separated.

A further object of this invention is to provide a novel arrangement of parts involving the means for supporting the ends of the springs in such a manner that when equalizing action is necessary or desirable to be provided, the spring ends are rendered operative by having appropriate means to move elements normally fixedly positioning the spring ends movable so that an equalizing member may be put into operation as the spring ends are moved into juxtaposition.

Yet another object of this invention is to provide novel elements in and of themselves including push bar links and push bars which operate certain sliding blocks which in turn engage spring ends in such a manner as to release and move the sliding blocks to render the spring ends free to move in conjunction with an equalizing member inserted therebetween and operative with respect thereto.

Other and further objects of the invention will be understood from a consideration of the specifications appended hereto and disclosed in the drawings wherein:

FIGURES 7, 8 and 9 are illustrative of the movement of the equalizing unit or equalizer into position to effect equalizing action with regard to the respective spring ends, these figures corresponding to the positions of the disclosures of the parts in FIGURES 4, 5 and 6 for purposes which will be apparent hereinafter, certain exceptions being noted.

FIGURE 10 is a plan view, largely fragmentary of certain portions of the operating elements including sliding blocks, hooks and push bar units which are provided on each of the bogies to cooperate in a manner illustrated in the prior figures described.

FIGURE 11 is a fragmentary view partly in elevation and in section taken about on the line 11—11 of FIGURE 10 looking in the direction of the arrows.

FIGURE 12 is a fragmentary sectional view taken about on the line 12—12 of FIGURE 10 looking in the direction of the arrows.

Figure 1:
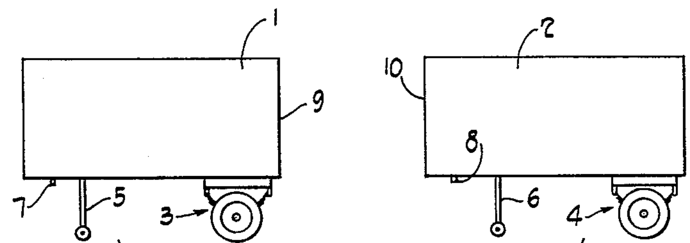
FIGURES 1, 2 and 3 are somewhat diagrammatic, illustrating the manner of assembling and disassembling units which in themselves are trailer units into a single unit and arranging the running gear therebeneath so that it will be in tandem condition in the event the body members are assembled and in single axle position when the body members are disconnected.
Figure 2:
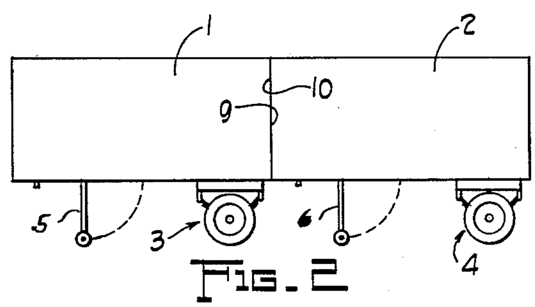
Figure 3:
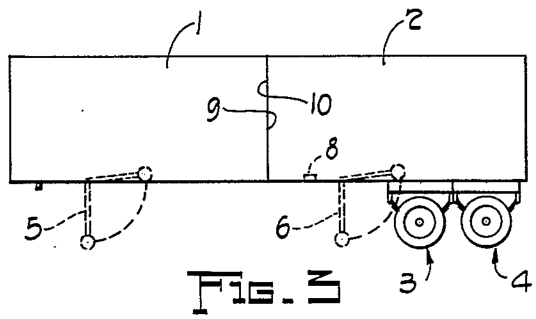

Referring first of all to FIGURES 1, 2 and 3, it will be noted that this invention is related particularly and is of primary advantage in relation to trailer units which are separable into individual body sections such as 1 and 2, including the bogie units 3 and 4 respectively which support the same for road travel, suitable landing gear such as 5 and 6 being provided with king pins such as 7 and 8 being incorporated in the body and arranged to move out of the way so as not to obstruct the lower surface of the body sections when it is found desirable or necessary to move the bogie units 3 and 4 or one of the other of the same along therebeneath.

The same condition should exist with regard to the landing gear members 5 and 6 which are foldable about as illustrated in the figures in the dotted line position and likewise similarly do not obstruct the lower portions of the body members.

As will be understood from the consideration of FIGURE 2, the body units in this case have been brought into juxtaposition with the rear end 9 of the unit 1 adjacent the front end 10 of the unit 2. Certain locking means are furnished which are not part of this invention but which will in any event maintain the connected relationship of the respective units.

The bogie unit 3 in this case is desirably moved to the rear of the body unit 2 and assumes a position about as illustrated in FIGURE 3 so that it is in tandem relationship to the bogie unit 4, and in this relationship the entire assembly may be moved over the highway as a highway trailer, in a manner which will be readily understood from the foregoing and along the lines illustrated, the landing gear necessarily having been moved into the dotted line positions illustrated and the king pin 8 of the rear unit 2 likewise having been folded into the dotted line position illustrated therein or in some manner removed so as to permit the bogie unit 3 to move to the condition illustrated in FIGURE 3.

It will be apparent that it is highly desirable for equalizing relationship between the bogie units to be established, and it is this concept which this invention is intended to embody in the respective mechanical elements illustrated in the subsequently described drawings.

Figures 13, 14:
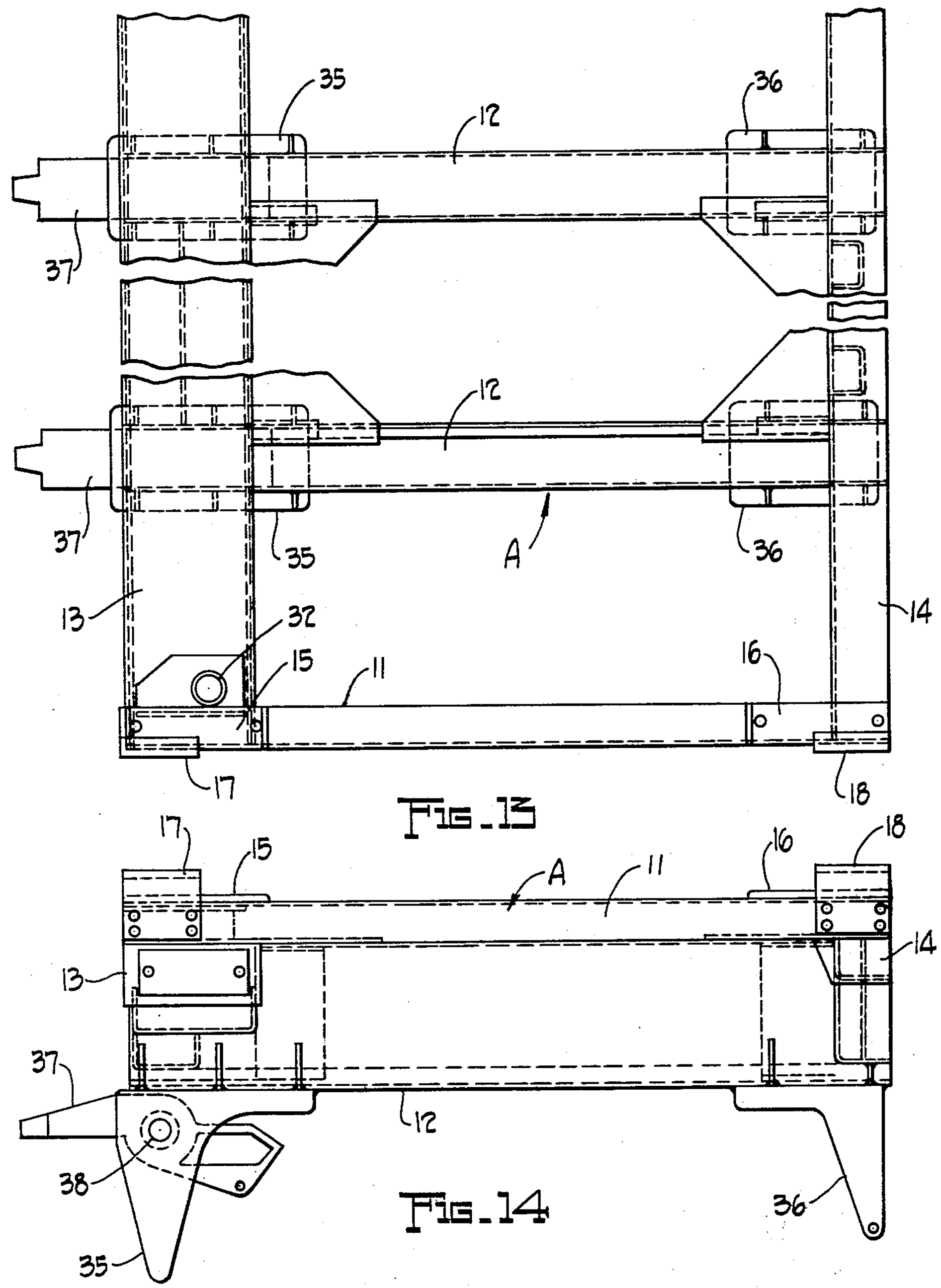
FIGURE 13 is a plan view illustrating in greater detail the bogie sub-frame members, beneath which the elements illustrated in FIGURE 10 are arranged.
FIGURE 14 is a side elevational view of the bogie sub-frame illustrating the frame construction in a manner corresponding to the disclosure of FIGURE 11 and emphasizing other details of the said frame.
Figure 15:
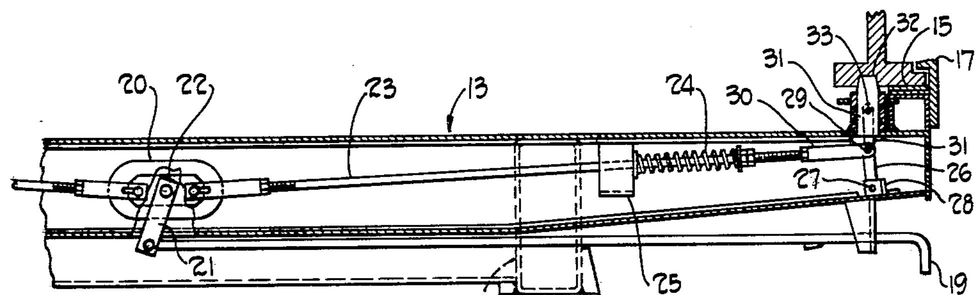
FIGURE 15 is a fragmentary end view, illustrating in detail certain locking means for the bogie units in respect to the bodies which they are intended to support these means facilitating movement of the bogie units as necessary along beneath the body units.

Turning therefore to FIGURES 13, 14 and 15, the bogie sub-frame illustrated may be either of the frames for the bogie units 3 or 4, they being identical and therefore only one being described hereinafter.

In this case the sub-frame is generally denoted A including longitudinal frame members 12 and transverse bolster assemblies 13 at the front and 14 at the rear, these bolster assemblies being suitably fastened to the longitudinal members 11 and 12 in any preferred manner so that a rigid sub-frame is provided, the arrangement of the sub-frame as viewed in FIGURE 13 being such that duplicate members 11 and 12 are provided for the opposite side of the frame in a manner which will be apparent to those skilled in this art.

The longitudinal members 11 for each bogie sub-frame, are equipped with plates 15 at the front and 16 at the rear which are wear plates and intended to engage with suitable rail formation of the body member or unit beneath which the bogie sub-frames are arranged, these being essentially sliding bogies, including the hold down members 17 and 18 a each side, these members being in the front and rear respectively. The hold down members 17 and 18 interlock with the rail of the body as will be readily understood from a consideration of FIGURE 15.

In the front bolster 13, certain mechanism is provided to positively fix the location of the bogie unit with regard to the body beneath which the same is located, this mechanism being one which is controllable from the side and particularly by a handle 19 as illustrated in the said FIGURE 15.

The handle 19 in turn controls a suitably rotatably mounted link 20 by means of a lever 21 connected to a pivot rod 22, link 20 in turn being connected to a further rod 23 extending outwardly and being maintained in outwardly extended position by means of the spring 24 arranged therearound and abutting a stop 25 within the bolster 13.

A toggle arrangement at the end of the rod 23 is provided and includes the lower link 26, pivotally connected at 27 at its lower end to a fixed member 28 in the bolster the upper end of the link 26 being connected at 29 to the rod 23 by suitable adjustable connection 30 and in turn connected with a further link 31 extending upwardly to a lock plunger 32 and being connected thereto at 33.

It will therefore be apparent that if the handle 19 is pulled outwardly to the right as viewed in FIGURE 15, the link 20 will be rotated in one direction, in this instance counterclockwise, the rod 23 will move to the left compressing the spring 24, shortening the distance between the pivots 33 and 27, and retracting the member 32 from its position in a suitable opening in the lower rail of the body member. Thereafter the entire bogie unit may be moved along the rail, as guided by the hold down members to a position it may be required to assume for example the position illustrated in FIGURE 3 of the drawings wherein the bogie unit 3 is brought into juxtaposition with the bogie unit 4. It will be understood of course that the bogie units 3 and 4 are substantially identical since they are intended to be interchangeable and include all of the same elements therein and operative in the same manner as herein being described, including this locking arrangement just set forth in detail. This locking arrangement is duplicated at the opposite side of each bogie unit.

Referring again to FIGURE 14, the same shows as extending beneath the longitudinal frame members 12 suitable front and rear hanger members 35 and 36 respectively, there being similar hanger members at opposite sides as generally suggested in FIGURE 13 and disclosed in plan as to their location therein.

The hanger members 35 will be denoted equalizer hanger members and the hanger members 36 described as the rear hanger members for purposes of distinguishing the same in order to describe the various elements related thereto in proper relationship as hereinafter set forth.

The equalizer hangers 35 include therein the equalizer members 37, pivotally arranged on the pivots 38, this being further illustrated in detail in respect to the arrangement and purpose thereof in FIGURES 7, 8 and 9 now to be referred to as a basis for further description herein.

Each equalizer hanger 35 includes therein, a suitable sliding block 39, which is connected to a top plate 40, which top plate 40 is slidable back and forth in suitable guides incorporated in the respective equalizer hangers 35. These slide blocks 39 are intended to cooperate with corresponding ends 41 of the equalizer member 37 with which each is associated in a manner to position the equalizer member and prevent pivotal movement thereof by the spring such as 42 which is engaged with the end 41 of the equalizer member 37, the spring 42 being duplicated and arranged in a spaced manner so as to support an axle engaged therewith in a generally conventional manner not herein illustrated in detail.

As will be understood from FIGURES 7, 8 and 9, when the slide block 39 is in the position of FIGURE 7 particularly, it will engage the upper surface of the portion 41 of the equalizer member 37, which portion 41 will in turn engage the corresponding end of the spring 42 and thereby in effect provide a solid bearing for said spring end, and thereby act as a spring perch.

Referring now to the front or forward bogie unit 3, in this particular instance the rear hanger 36 is somewhat less complicated than the hanger 35, embodying only a slide block 43 therein, supported on a suitable plate 44, for movement back and forth in the hanger 36, the slide block 43 being adapted to engage a pillow block 45, fixed to the end of the spring 46. It will be understood that the slide block 43 is normally in engagement with the pillow block 45 when the units 3 and 4 are separated, the slide blocks 39 and 43 being movable so that the equalizer member 37 can effect its equalizing action, with the end 37*a* engaging the pillow block 45 when the units 3 and 4 are moved into juxtaposition as illustrated in FIGURE 9, the intermediate position during such movement being illustrated by FIGURE 8, as will be readily understood.

With the units 3 and 4 in the position of FIGURE 9, it will be noted that the equalizer member 37 will perform its equalizing action, to shift the weight from the end of one spring such as 42 to the end of the spring 46 or vice versa in accordance with the road surface over which the vehicle is traveling, the pillow block 45 engaging the end 37*a* of the hanger and the end of the spring 42 engaging the corresponding end 41 of the equalizer member 37.

Figure 4:
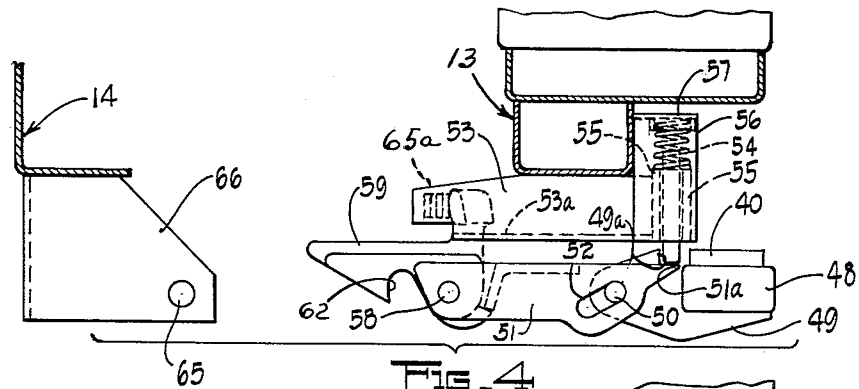
FIGURES 4, 5 and 6 are fragmentary views, partly in section, illustrating certain of the means mounted on the respective bogie sub-frames which are provided to move and release the spring ends for equalizing action, with subsequent operation in a manner to render the spring ends relatively fixed against equalizing action as the conditions may require.
Figure 5:
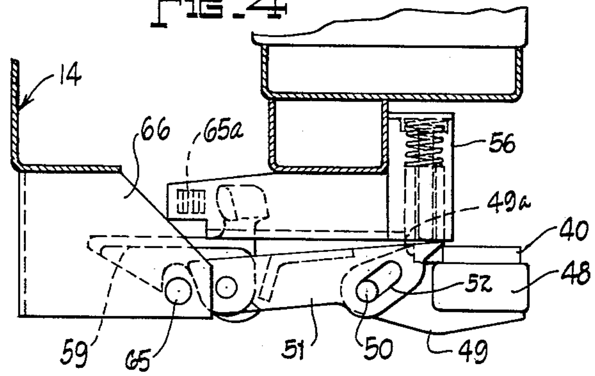
Figure 6:
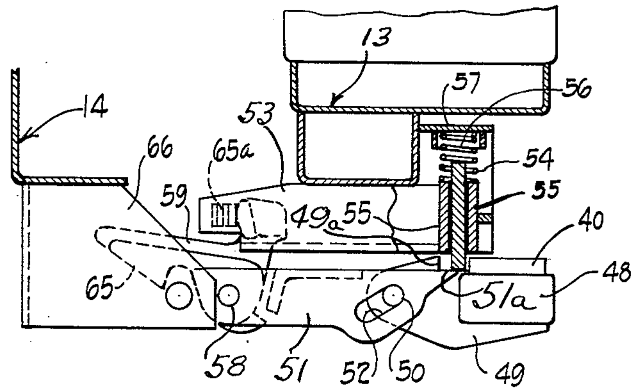

In order to explain the manner in which the slide blocks 39 and 43 are moved, reference is now made to FIGURES 4, 5 and 6 which show in detail the control mechanism for effecting this operation, FIGURES 10 and 11 likewise illustrating certain details.

At the front portion of each bogie unit sub-frame is the control mechanism which provides for movement of the sliding blocks previously referred to, this control mechanism comprising a number of movable members including a transversely extending push bar 48, which as shown in FIGURE 10 and likewise in FIGURE 11, is connected at its ends to the slide blocks 39, there being one at each end as will be readily understood, the slide blocks in turn engaging the top plates 40, likewise provided at each end and engaging and fastened to the slide blocks 39 aforesaid.

Intermediate the ends of the push bar 48, are the connector parts 49, there being one at each side, these parts in turn being pivotally connected at 50 to push bar links 51. The push bar links 51 engage the connectors 49 by means of an elongated opening or slot 52 in each of the push bar links, which slot permits an upward movement of the end of the link 51 which will be understood from a consideration of FIGURES 4 and 5 and of the relative positions of the links 51 in each. The pivot 50 engages the upper end of the slot 52 as shown in FIGURE 4, as compared with the position in FIGURE 5 wherein the link has been moved enough so that its end is raised and the pivot 50 is therefore at the lower end of the slot 52. This action is an unlatching action for mechanism included in a hook rail and lock assembly generally denoted 53, including at one end thereof a latch member 54 adapted to be moved upwardly and downwardly in guides 55 against a spring 56, which spring 56 presses at its upper end against the top of the assembly at 57 and normally maintains the latch member 54 in its downward or lowermost position.

The push bar link in its action previously described with reference to the slot 52, includes a shoulder 51*a*, which is intended to engage the lower end of the latch member 54 and by the movement described as respects FIGURES 4 and 5 raise the latch member 54 out of engagement behind a shoulder 49*a* formed on the connector 49 previously referred to. It will be understood that by reason of this formation, the connector 49 and associated parts including the push bar 48, are maintained in fixed position until released in the manner specified, this in turn maintaining the slide blocks 39 in locked condition with reference to the equalizer member 37 whereby the spring 42 at the end thereof will have merely its normal end engaging action in contrast to the equalizing action already described and to be subsequently described further.

Figure 16:
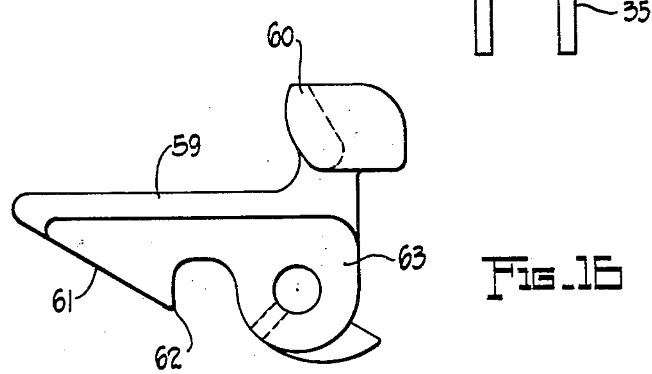
FIGURE 16 is a detail view of one of the parts of the control units which are availed of to provide for movement of the certain sliding blocks.

Referring again to FIGURES 4, 5 and 6 particularly, the push bar link 51 engages a hook 59 at its end opposite the slot 52, by means of a pivot 58, which hook is formed as shown in detail in FIGURE 16 with an enlarged head 60, a body 61, a hook portion 62 and a connecting part 63 in which the pivot 58 is positioned. The enlarged head 60 is formed to support the hook, the end of link 51 connected thereto within the hook rail and lock assembly 53 by resting on inwardly extending shoulders 53*a* of said assembly. The push bar link 51 is thus normally maintained about level and the hook 59 likewise maintains the attitude generally disclosed in FIGURE 4 until such time as movement of the same is effected in a manner to be subsequently set forth.

It should be understood from the foregoing that the push bar link 51 is susceptible of being moved to the right as viewed in FIGURES 4, 5 and 6, carrying with it the pivot 58, and riding upwardly at its right hand end by reason of the slot 52 therein over the pivot 50 mounted on the connector 49.

Figure 17:
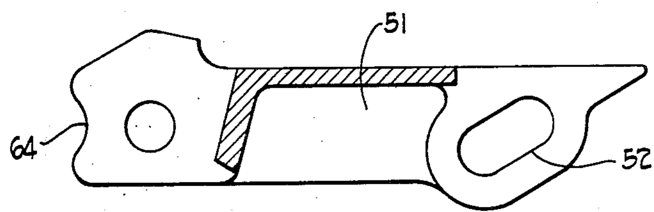
FIGURE 17 is a sectional view of a push bar link availed of in the same control unit as FIGURE 16.
Figure 18:
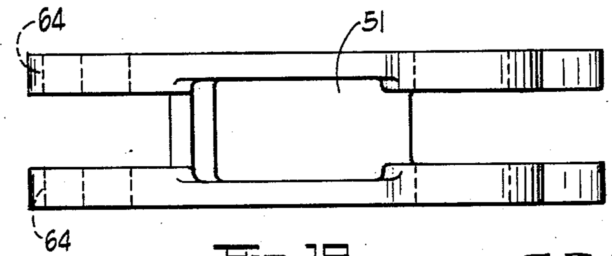
FIGURE 18 is a bottom plan view of the link shown in FIGURE 17.

The push bar link 51 is formed as illustrated in FIGURE 17 with a bar engaging notch 64, which notch is arranged to engage with a control bar 65 supported in control bar brackets 66, which brackets extend below the bogie sub-frame transverse member or bolster 14, so that the brackets 66 and control bar associated therewith are at about the positions illustrated in FIGURES 4, 5 and 6, during the connecting movements.

In considering FIGURE 10, it will be noted that the control bars and brackets on the bogie sub-frame bolster 14 are shown as being mounted outwardly of the control instrumentalities. In the right hand portion of FIGURE 10, and thus at the rear of the unit, the control instrumentalities, being virtual duplicates of those illustrated in FIGURES 4, 5 and 6 at the left hand portion of FIGURE 10 are located outwardly of the control bars and brackets connected with the bolster 13.

The foregoing will indicate that the front and rear portions of each of the bogie units are complementary for purposes which will be understood as the operation of the devices just previously described in detail is set forth at this point.

Considering therefore that the control instrumentalities illustrated at the right in FIGURE 4 are those which are at the left in FIGURE 10 for the purposes of ease of description, and the control bars and brackets at the left in FIGURE 4 are those at the right in FIGURE 10, or in any event located in the same relative positions on respective bogie units, the bogie unit 3 may be said to be caused to move to the right as viewed in FIGURE 2 until it assumes or begins to assume the position illustrated in FIGURE 3. As it approaches the position of FIGURE 3, the relationship established in FIGURE 4 exists, and carrying the movement further, that of FIGURE 5 likewise takes place, the link 51 riding up on the pivot 50 releasing the latch member 54, and thereby because of the engagement of the control bar 65 with the notched end 64 of the link 51 causes the link and its associated parts including the push bar connected with the connector 49 to move toward the right as viewed in the respective figures, thus carrying with the bar the slide blocks at each end thereof. When the bogie units 3 and 4 are in full juxtaposition, the conditions illustrated in FIGURES 3, 5 and 9 exist. At this time the locking mechanism illustrated in FIGURE 15 is caused to be actuated by pushing inwardly on the handle 19, whereby the members 32 move upwardly into suitable openings in the rails along which the bogie unit slides beneath the body member 2 so that thereafter the relationship established by the movements described is maintained during movement of the entire trailer unit including the body members 1 and 2. It will be likewise understood that the equalizing action provided by the equalizing members 37 may take place with the ends of the springs 42 and 46 correspondingly shifting and responding to the surface over which the entire unit is traveling.

Should it thereafter be desired to separate the units so that the condition of the respective body members 1 and 2 as in FIGURE 1 exists for the purposes of using the body members as separate trailer units, the locking mechanism of FIGURE 15 is again manipulated by pulling outwardly on the handle 19 toward the right, retracting the lock members 32 and permitting the bogie unit 3 to be moved to the condition of FIGURE 2. Thereafter the locking mechanism is actuated to maintain the bogie unit 3 in said FIGURE 2 position so that it can be used in the relationship of FIGURE 1 thereafter as may be necessary.

During the separating action after the locking mechanism of FIGURE 15 has been actuated, the control elements including the control bars 65 have been caused to move toward the left in FIGURE 6, this in turn effecting an engagement of the heads 60 of the hooks 59 with suitable sections **65*a* of the hook rail and lock assemblies 53, because the control bars pull on the hook sections 62 and the heads 60 impinge against the sections 65*a***.

As will be understood from FIGURE 6, this causes a clockwise movement of the hooks 59, whereby the same are released after they have moved the links and associated mechanism to the left, permitting thereafter the separation of the respective bogies 3 and 4, without further movement of the push bar 48 connected to the links and hooks. The latch members 54 will have moved downwardly again under the compulsion of the springs 56 so that they latch behind the hook sections **49*a* of the connectors 49 to thereafter retain the push bars and associated slide blocks in condition so that the equalizer members 37 are no longer operative as such but merely engage the ends of the springs 42** and maintain the usual single axle operating position with respect thereto.

It will be apparent that the same action which has been described in relation to the mechanism at the left in FIGURE 10, has taken place with regard to that mechanism at the right in FIGURE 10, which corresponds to the left in FIGURES 4, 5 and 6 and 7, 8 and 9 so that the slide blocks 43 are positioned over the pillow blocks 45 and maintain the springs 46 in normal single axle position.

It should be understood that more than two of the bogie units such as 3 and 4 may be provided if desired, but as will commonly be the case only two such axle bogie units are generally contemplated to be used.

It will be understood further that the respective sides of the bogie units and sub-frames with associated mechanism carried thereby are symmetrical and that the fore and aft sections are complementary in every respect.

I claim:

1. In trailer construction of the class described, in combination, a body, forward and aft bogie units supporting the body, spring means in said units, spring supports in each including movable means, equalizing means in at least one of said units, and means on at least one of said units to move the movable means when the units are brought into juxtaposition, whereby the equalizing means engage the spring means and are rendered operative to effect equalizing action, said movable means including sliding blocks, push bars connected thereto, connectors are fixed to the bars, links engage the connectors, hooks engage the links, the spring means include spring members, latch means releasably maintain the movable means in spring member engaging position, and the means to move the movable means comprise contact parts engageable with the hooks aforesaid, whereby to move the same in one direction to release the latch means and in another direction to cause engagement thereof.

2. The combination as claimed in claim 1, wherein the equalizing means comprise pivotally mounted members having end portions engaging adjacent ends of spring members when the units are in juxtaposition, and at least certain of the sliding blocks when the units are separated, other of the sliding blocks engaging corresponding spring members, and the units are releasably engaged with the body.

3. The combination as claimed in claim 1, wherein the body is provided with a hook rail assembly for each movable means, said assembly including elements to engage the hooks whereby to release the same when the units are separated.

4. The combination as claimed in claim 1, wherein the contact parts are formed to engage the links when the units are moved to adjoining positions, to cause movement of the links and release movement of the latch means, and hook rail assemblies are provided and include parts to engage the hooks when the units are separated and release said hooks from the contact parts aforesaid.

References Cited in the file of this patent

UNITED STATES PATENTS

| | | |
|---|---|---|
| 2,665,142 | Talbert | Jan. 5, 1954 |
| 3,004,772 | Bohlen | Oct. 17, 1961 |
| 3,043,605 | McKay | July 10, 1962 |